(12) United States Patent
Bishara

(10) Patent No.: US 7,120,834 B1
(45) Date of Patent: Oct. 10, 2006

(54) FAST PORT FAILOVER IN A NETWORK SWITCH

(75) Inventor: Nafea Bishara, Tarshiha (IL)

(73) Assignee: Marvell International Ltd., Hamilton (BM)

( * ) Notice: Subject to any disclaimer, the term of this patent is extended or adjusted under 35 U.S.C. 154(b) by 585 days.

(21) Appl. No.: 10/353,451

(22) Filed: Jan. 28, 2003

Related U.S. Application Data (60) Provisional application No. 60/368,936, filed on Mar. 29, 2002.

(51) Int. Cl.
   *G06F 11/00* (2006.01)
(52) U.S. Cl. .......................... 714/43; 370/351
(58) Field of Classification Search ................. 714/43; 370/224, 351
   See application file for complete search history.

(56) References Cited

U.S. PATENT DOCUMENTS

| 5,781,715 A | 7/1998 | Sheu |
| 6,032,266 A | 2/2000 | Ichinohe et al. |
| 6,229,787 B1 | 5/2001 | Byrne |
| 6,246,666 B1 | 6/2001 | Purcell et al. |
| 6,360,331 B1 | 3/2002 | Vert et al. |
| 6,366,558 B1 | 4/2002 | Howes et al. |
| 6,888,792 B1 * | 5/2005 | Gronke ........................ 370/227 |
| 2003/0021223 A1 * | 1/2003 | Kashyap ....................... 370/217 |
| 2003/0058880 A1 * | 3/2003 | Sarkinen et al. ............ 370/413 |

FOREIGN PATENT DOCUMENTS

WO        WO 01/95564 A2     12/2001

* cited by examiner

*Primary Examiner*—Dieu-Minh Le (57) ABSTRACT

A network switch, method and computer program product. The network switch comprises a plurality of ports each adapted to exchange frames of data with one or more network devices; a transfer circuit adapted to transfer the frames of the data between the ports; and wherein at least one of the ports comprises a loopback circuit adapted to send to the transfer circuit, when the one of the ports is not operational, each frame of the data received by the one of the ports from the transfer circuit, and a redirect circuit adapted to cause the transfer circuit to transfer, to one or more predetermined others of the ports, when the one of the ports is not operational, each frame of the data received by the transfer circuit from the one of the ports.

48 Claims, 7 Drawing Sheets

FAST PORT FAILOVER IN A NETWORK SWITCH

CROSS-REFERENCE TO RELATED APPLICATIONS

This application claims the benefit of U.S. Provisional Patent Application Ser. No. 60/368,936, filed Mar. 29, 2002, the disclosure thereof incorporated by reference herein in its entirety.

BACKGROUND

The present invention relates generally to data communications. More particularly, the present invention relates to port failover in network switches and routers.

When a port fails in a network switch, the switch executes a failover process. In conventional failover processes, a processor, either within the switch or external to the switch, modifies forwarding tables in the switch. The forwarding tables are used by the switch to direct data from port to port. The failover process modifies the forwarding tables to redirect traffic away from the failed port to other ports in the switch.

One disadvantage of this approach is that modifying forwarding tables is a time-consuming process, especially in a large switch, because some or all of the information in one forwarding table is replicated across many forwarding tables, and/or because the forwarding tables are large. All of these forwarding tables must be modified. Until all of the forwarding tables are modified, data transmitted to the failed port either must be re-transmitted, or is lost.

SUMMARY

In general, in one aspect, the invention features a network switch comprising a plurality of ports each adapted to exchange frames of data with one or more network devices; a transfer circuit adapted to transfer the frames of the data between the ports; and wherein at least one of the ports comprises a loopback circuit adapted to send to the transfer circuit, when the one of the ports is not operational, each frame of the data received by the one of the ports from the transfer circuit, and a redirect circuit adapted to cause the transfer circuit to transfer, to one or more predetermined others of the ports, when the one of the ports is not operational, each frame of the data received by the transfer circuit from the one of the ports.

Particular implementations can include one or more of the following features. A destination address and a destination port identifier are associated with each of the frames of the data, wherein the destination address is associated with one or more of the network devices, wherein the destination port identifier identifies one or more of the ports, and wherein the transfer circuit comprises a forwarding engine adapted to forward each frame of the data from the one of the ports to one or more others of the ports according to the destination address associated with the frame of the data when the one of the ports is operational; wherein the redirect circuit comprises a replace circuit adapted, when the one of the ports is not operational, to replace, with destination identifiers of the one or more predetermined others of the ports, the destination port identifier associated with each frame of the data received by the one of the ports from the transfer circuit, and a forwarding override circuit adapted, when the one of the ports is not operational, to cause the forwarding engine to forward each frame of the data received by the transfer circuit from the one of the ports according to the destination port identifier associated with the frame, and not according to the destination address associated with the frame. Implementations comprise a memory adapted to store one or more forwarding tables containing associations between the ports and the destination addresses; wherein the forwarding engine is further adapted, when the one of the ports is operational, to forward each frame of the data according to the associations contained in the forwarding tables and the destination address associated with the frame of the data; and a controller adapted to modify the forwarding tables to replace the associations between the one of the ports and the destination addresses with associations between the one or more predetermined others of the ports and the destination addresses. A destination address and a destination port identifier are associated with each of the frames of the data, wherein the destination address is associated with one or more of the network devices, wherein the destination port identifier identifies one or more of the ports, wherein the transfer circuit comprises a forwarding engine adapted to forward each frame of the data from the one of the ports to one or more others of the ports according to the destination address associated with the frame of the data; wherein the redirect circuit comprises a replace circuit adapted, when the one of the ports is not operational, to replace the destination port identifier associated with each frame of the data received by the one of the ports from the transfer circuit with destination identifiers of the one or more predetermined others of the ports; and wherein the transfer circuit further comprises a bypass circuit adapted to forward, when the one of the ports is not operational, each frame of the data received by the transfer circuit from the one of the ports according to the destination port identifier associated with the frame, and not according to the destination address associated with the frame. Implementations comprise a memory adapted to store one or more forwarding tables containing associations between the ports and the destination addresses; wherein the forwarding engine is further adapted, when the one of the ports is operational, to forward each frame of the data according to the associations contained in the forwarding tables and the destination address associated with the frame of the data; and a controller adapted to modify the forwarding tables to replace the associations between the one of the ports and the destination addresses with associations between the one or more predetermined others of the ports and the destination addresses. The redirect circuit is implemented within at least one of the group comprising one or more port queues of the one of the ports; a media access controller of the one of the ports; and a physical layer device of the one of the ports. The loopback circuit is implemented within at least one of the group comprising one or more port queues of the one of the ports; a media access controller of the one of the ports; and a physical layer device of the one of the ports. The one of the ports and the one or more predetermined others of the ports are members of a link aggregation group, and the network switch further comprises a controller adapted to remove the one of the ports from the link aggregation group when the one of the ports is not operational. The controller, when a learning mode is enabled for the one of the ports, modifies the associations contained in the forwarding tables to associate the one of the ports with source addresses of frames of the data received by the forwarding engine from the one of the ports; and the learning mode is disabled for the one of the ports when the one of the ports is not operational.

In general, in one aspect, the invention features a port failover circuit for redirecting frames of data, sent to a port in a network switch by a transfer circuit in the network switch, to one or more other ports in the network switch, comprising a loopback circuit adapted to send to the transfer circuit, when the port is not operational, each frame of the data received by the port from the transfer circuit, and a redirect circuit adapted to cause the transfer circuit to transfer, to one or more predetermined others of the ports, when the port is not operational, each frame of the data received by the transfer circuit from the port.

Particular implementations can include one or more of the following features. A destination address and a destination port identifier are associated with each of the frames of the data, wherein the destination address is associated with one or more network devices, wherein the destination port identifier identifies one or more of the ports, and the redirect circuit comprises a replace circuit adapted, when the port is not operational, to replace, with destination identifiers of the one or more predetermined others of the ports, the destination port identifier associated with each frame of the data received by the port from the transfer circuit, and a forwarding override circuit adapted, when the port is not operational, to cause the transfer circuit to forward each frame of the data received by the transfer circuit from the port according to the destination port identifier associated with the frame, and not according to the destination address associated with the frame. The redirect circuit is implemented within at least one of the group comprising one or more port queues of the port; a media access controller of the port; and a physical layer device of the port. The loopback circuit is implemented within at least one of the group comprising one or more port queues of the port; a media access controller of the port; and a physical layer device of the port.

In general, in one aspect, the invention features a network comprising a first network device; a second network device; a network switch comprising a first port adapted to receive frames of the data from the first network device, a second port adapted to send the frames of the data to the second network device, one or more third ports adapted to send the frames of the data to the second network device, and a transfer circuit adapted to transfer the frames of the data from the first port to the second port, wherein the second port comprises a loopback circuit adapted to send to the transfer circuit, when the second port is not operational, each frame of the data received by the second port from the transfer circuit, and a redirect circuit adapted to cause the transfer circuit to transfer, to the one or more third ports, when the second port is not operational, each frame of the data received by the transfer circuit from the second port.

Particular implementations can include one or more of the following features. A destination address and a destination port identifier are associated with each of the frames of the data, wherein the destination address is associated with one or more of the network devices, the destination port identifier identifies one or more of the ports, and the transfer circuit comprises a forwarding engine adapted to forward each frame of the data to one or more of the ports according to the destination address associated with the frame of the data when the second port is operational; wherein the redirect circuit comprises a replace circuit adapted, when the second port is not operational, to replace, with the destination identifier of the one or more third ports, the destination port identifier associated with each frame of the data received by the second port from the transfer circuit, and a forwarding override circuit adapted, when the second port is not operational, to cause the forwarding engine to forward each frame of the data received by the transfer circuit from the second port according to the destination port identifier associated with the frame, and not according to the destination address associated with the frame. The network switch further comprises a memory adapted to store one or more forwarding tables containing associations between the ports and the destination addresses; wherein the forwarding engine is further adapted, when the second port is operational, to forward each frame of the data according to the associations contained in the forwarding tables and the destination address associated with the frame of the data; and a controller adapted to modify the forwarding tables to replace the associations between the second port and the destination addresses with associations between the one or more third ports and the destination addresses. A destination address and a destination port identifier are associated with each of the frames of the data, wherein the destination address is associated with one or more of the network devices, wherein the destination port identifier identifies one or more of the ports, wherein the transfer circuit comprises a forwarding engine adapted to forward each frame of the data to one or more of the ports according to the destination address associated with the frame of the data; wherein the redirect circuit comprises a replace circuit adapted, when the second port is not operational, to replace the destination port identifier associated with each frame of the data received by the second port from the transfer circuit with destination identifiers of the one or more third ports; and wherein the transfer circuit further comprises a bypass circuit adapted to forward, when the second port is not operational, each frame of the data received by the transfer circuit from the second port according to the destination port identifier associated with the frame, and not according to the destination address associated with the frame. Implementations comprise a memory adapted to store one or more forwarding tables containing associations between the ports and the destination addresses; wherein the forwarding engine is further adapted, when the second port is operational, to forward each frame of the data according to the associations contained in the forwarding tables and the destination address associated with the frame of the data; and a controller adapted to modify the forwarding tables to replace the associations between the second port and the destination addresses with associations between the one or more third ports and the destination addresses. The redirect circuit is implemented within at least one of the group comprising one or more port queues of the second port; a media access controller of the second port; and a physical layer device of the second port. The loopback circuit is implemented within at least one of the group comprising one or more port queues of the second port; a media access controller of the second port; and a physical layer device of the second port. The second port and the one or more third ports are members of a link aggregation group, and the network switch further comprises a controller adapted to remove the second port from the link aggregation group when the second port is not operational. The controller, when a learning mode is enabled for the second port, modifies the associations contained in the forwarding tables to associate the second port with source addresses of frames of the data received by the forwarding engine from the second port; and the learning mode is disabled for the second port when the second port is not operational.

In general, in one aspect, the invention features a method and computer-readable media for handling port failover in a network switch comprising a plurality of ports, wherein each of the ports is adapted to exchange frames of data with one or more network devices, and a transfer circuit for transferring the frames of the data between the ports. It comprises detecting that one of the ports is not operational; sending to the transfer circuit, when the one of the ports is not operational, each frame of the data received by the one of the ports from the transfer circuit, and causing the transfer circuit to transfer, to one or more predetermined others of the ports, when the one of the ports is not operational, each frame of the data received by the transfer circuit by the one of the ports.

Particular implementations can include one or more of the following features. A destination address and a destination port identifier are associated with each of the frames of the data, wherein the destination address is associated with one or more of the network devices, wherein the destination port identifier identifies one or more of the ports, wherein the transfer circuit forwards each frame of the data from the one of the ports to one or more others of the ports according to the destination address associated with the frame of the data when the one of the ports is operational, and wherein causing the transfer circuit to transfer comprises replacing, with destination identifiers of the one or more predetermined others of the ports, the destination port identifier associated with each frame of the data received by the one of the ports from the transfer circuit, and causing the transfer circuit to forward each frame of the data received by the transfer circuit from the one of the ports according to the destination port identifier associated with the frame, and not according to the destination address associated with the frame. The network switch transfers the frames of the data between the ports according to one or more forwarding tables containing associations between the ports and the destination addresses, and wherein the method further comprises modifying the forwarding tables to replace the associations between the one of the ports and the destination addresses with associations between the one or more predetermined others of the ports and the destination addresses. The one of the ports and the one or more predetermined others of the ports are members of a link aggregation group, and the method further comprises removing the one of the ports from the link aggregation group when the one of the ports is not operational. The network switch, when a learning mode is enabled for the one of the ports, modifies the associations contained in the forwarding tables to associate the one of the ports with source addresses of frames of the data received by the transfer circuit from the one of the ports, and wherein the method further comprises disabling the learning mode for the one of the ports when the one of the ports is not operational.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Figure 1:
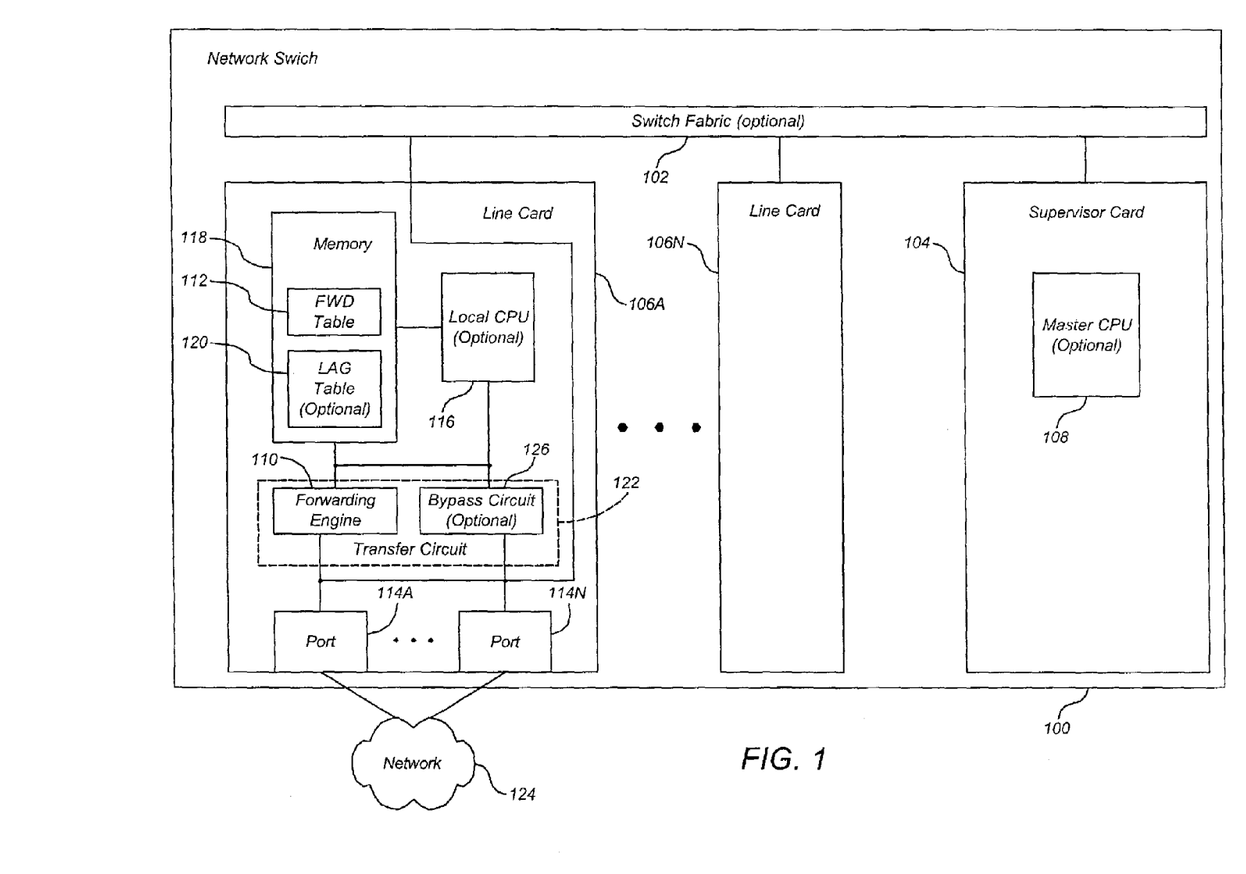
FIG. 1 shows a distributed multilayer switch according to a preferred embodiment.

FIG. 1 shows a distributed multilayer network switch 100 for transferring frames of data between network devices such as switches, routers, computers, and other network-enabled devices, according to a preferred embodiment. Although aspects of the invention are described with respect to this embodiment, this description applies equally well to distributed multilayer routers, distributed single-layer routers and switches, non-distributed multilayer routers and switches, non-distributed single-layer routers and switches, and similar devices. Switch 100 includes an optional switch fabric 102, a supervisor card 104, and a plurality of line cards 106A through 106N. Supervisor card 104 includes an optional master central processing unit (CPU) 108. Each line card 106 includes a memory 118, one or more ports 114A through 114N, an optional local CPU 116, and a transfer circuit 114 that includes a forwarding engine 110 and an optional bypass circuit 126. Memory 119 stores one or more forwarding (FWD) tables 112 and an optional link aggregation (LAG) table 120. Port 114 communicates with a network 124 by exchanging frames of data.

Associated with each frame of data are a source address that is associated with the network device that is the source of the frame, a destination address that is associated with the network device that is the destination of the frame, and one or more destination port identifiers that identify ports 114 in the network switch 100. In some cases an address that is associated with a network device identifies the network device. In other cases, such as with protocols like ATM and MPLS, an address that is associated with a network device identifies a path for the network device. Forwarding tables 112 contain associations between the addresses and ports 114. Forwarding tables 112 can include bridge tables, internet protocol (IP) next hops tables, multi-protocol layer switching (MPLS) next hops tables, tunnels tables, address translation tables for different layers, and the like. Forwarding tables 112 can be populated before provisioning of the network switch 100 and/or by learning processes executed during the operation of the network switch 100. For example, when a learning mode is enabled for a port 114, a controller such as local CPU 116, master CPU 108, or some other device modifies the associations contained in the forwarding tables to associate the port 114 with the source addresses of frames received by forwarding engine 110 from the port 114.

Forwarding engine 110 uses information stored in forwarding tables 112 to transfer the frames between the ports 114 in a line card 106, and between the ports 114 on one line card 106 and the ports 114 on other line cards 106. When all of the ports are operational, forwarding engine 110 uses information stored in forwarding tables 112 and the destination addresses of the frames to transfer the frames between the ports 114. For example, when forwarding engine 110 receives a frame from a port 114, it replaces the destination port identifier associated with the frame with the port identifier for the port associated with the destination address of the frame using the associations contained in forwarding tables 112.

Figure 2:
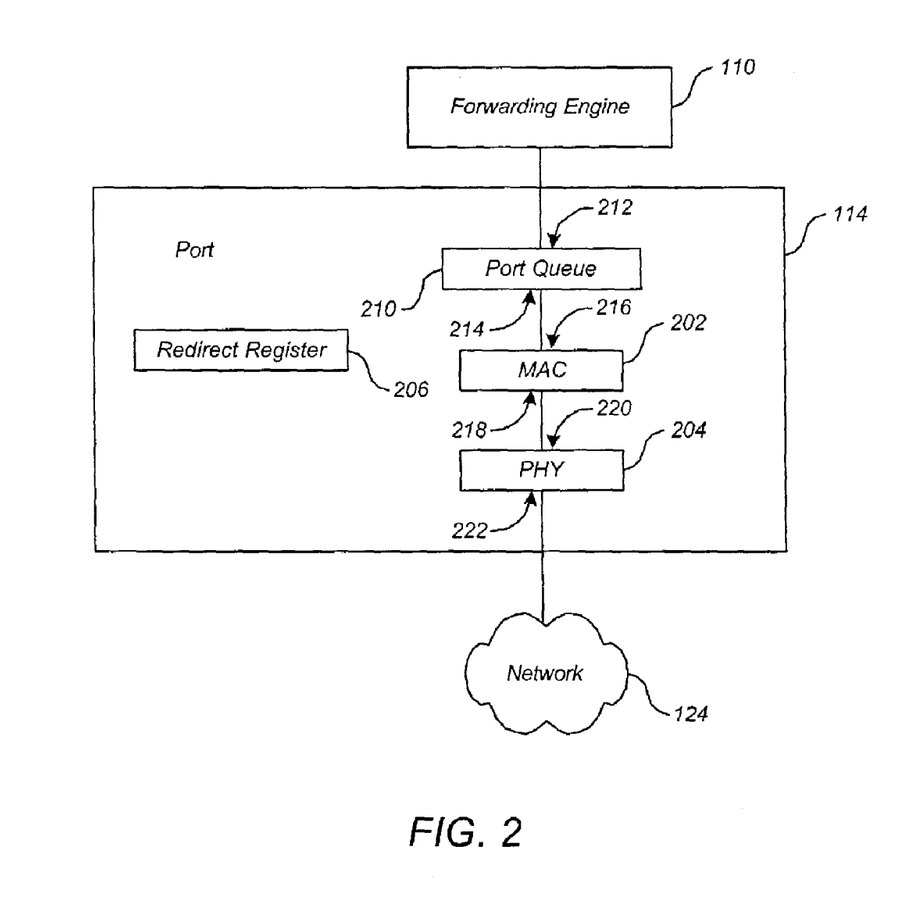
FIG. 2 shows detail of a port of the switch of FIG. 1 according to a preferred embodiment.

FIG. 2 shows detail of a port 114 according to a preferred embodiment. Port 114 includes a media access controller (MAC) 202 in communication with forwarding engine 110 and a physical layer device (PHY) 204 in communication with network 124. MAC 202 and PHY 204 together transfer data between network 124 and forwarding engine 110 through port 114. Port 114 further comprises one or more port queues 210 to store data handled by port 114. PHY 204 communicates with network 124 using a network-side interface 222, and communicates with MAC 202 using a MAC-side interface 220. MAC 202 communicates with PHY 204 using a PHY-side interface 218, and communicates with port queue 210 using a queue-side interface 216. Port queue 210 communicates with MAC 202 using a MAC-side interface 214, and communicates with forwarding engine 110 using a switch-side interface 212. Port 114 also includes a redirect register 206, the contents of which identify one or more backup ports associated with the port 114, as described in detail below.

Conventional ports in a network switch often include a feature referred to as "loopback mode." Loopback mode is conventionally used as a diagnostic procedure in which a frame egressed by a port is then ingressed by the port. The returned frame can be compared with the transmitted frame to evaluate the integrity of the port or the communications link serving the port. Referring to FIG. 2, a frame of data is ingressed by a port when it is received by network-side interface 222 of PHY 204, PHY-side interface 218 of MAC 202, or MAC-side interface 214 of port queue 210. A frame of data is egressed by a port when it is received by MAC-side interface 220 of PHY 204, queue-side interface 216 of MAC 202, or switch-side interface 212 of port queue 210.

The inventor has recognized that loopback mode can be used for another purpose. In a preferred embodiment, loopback mode is used as part of a fast failover process to redirect frames forwarded to a failed port 114 by forwarding engine 110 so that the frames are instead forwarded to one or more other ports 114 in the network switch 100, referred to herein as "backup ports." In this process, loopback mode is implemented by a loopback circuit that can be implemented within one or more of the port queues 210 of the network switch 100, within the media access controller 202 of the failed port 114, within the physical layer device 204 of the failed port 114, or by other methods. The loopback circuit implements loopback mode in response to the failure of the port 114. A redirect circuit then redirects the frames returned by the loopback circuit to the backup ports, as described in detail below.

Figure 3:
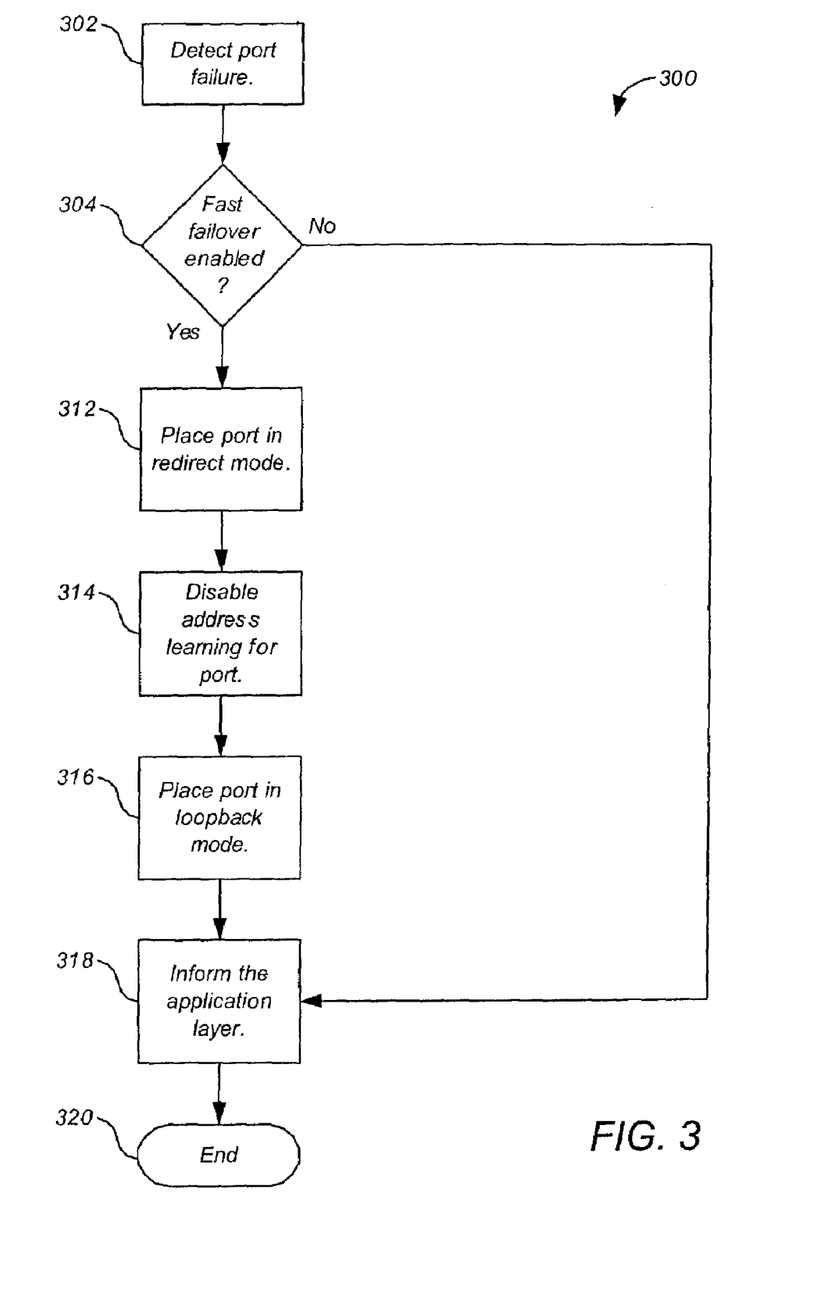
FIG. 3 shows a fast failover process according to a preferred embodiment.

FIG. 3 shows a fast failover process 300 according to a preferred embodiment. Portions of process 300 can be implemented by local CPU 116, by master CPU 108, forwarding engine 110, and by controllers located within ports 114 or elsewhere in network switch 100. Although the steps of process 300 are described in a particular order, other embodiments can execute the steps in other orders, as will be apparent to one skilled in the relevant art after reading this description.

Process 300 begins when switch 100 detects the failure of a port 114 (that is, that the port 114 is not operational—step 302). Switch 100 can detect the failure of the port 114 by any of several methods well-known in the relevant arts. For example, port failure can be detected by the physical layer device 204 in the port 114, by the media access controller 202 in the port, by devices at other layers in the port, or by a controller such as the local CPU 116 or the master CPU 108. For example, the local CPU 116 can determine that a port 114 has failed when the port attempts to egress a frame of data a predetermined number of times, by testing a register bit in the port, or by like methods.

In a preferred embodiment, the fast failover process 300 can be enabled or disabled for each port 114. Therefore process 300 determines whether fast failover is enabled for the failed port 114 (step 304). If fast failover is disabled for the failed port 114, process 300 informs the application layer of the network switch software of the port failure (step 318), preferably using a top-layer application programming interface executing on master CPU 108, and then ends (step 320). The application layer then modifies the forwarding tables 112 according to conventional methods. For example, the application layer modifies the forwarding tables 112 to replace the associations between addresses and the failed port 114 with associations between the addresses and the backup ports.

But if fast failover is enabled for the failed port 114, process 300 places the failed port 114 in a mode referred to herein as "redirect mode" (step 312). In redirect mode, a port 114 causes transfer circuit 122 to transfer all frames received from the port 114 to one or more predetermined backup ports 114 regardless of the content of the frames, such as layer-2 and layer-3 addresses.

The identity of the backup ports associated with a port 114 is preferably stored in a redirect register 206 in the port 114. When a port 114 belongs to a link aggregation group, the contents of redirect register 206 identify the link aggregation group. When a port 114 does not belong to a link aggregation group, the contents of redirect register 206 identify a backup port 114; in this case the redirect register 206 is preferably loaded before provisioning of the network switch 100. Redirect mode is preferably implemented by a redirect circuit that can be implemented within one or more of the port queues 210 of the network switch 100, within the media access controller 202 of the failed port 114, within the physical layer device 204 of the failed port 114, or by other methods.

The redirect circuit implements redirect mode in response to the failure of the port 114. The redirect circuit replaces the destination port identifier associated with each frame received by the failed port 114 from transfer circuit 122 with the destination port identifiers of one or more of the backup ports. In one embodiment, the redirect circuit then causes forwarding engine 110 to forward all frames received from the failed port 114 to the one or more backup ports 114 identified by the new destination port identifiers without regard to the destination addresses associated with the frames. In another embodiment, the redirect circuit causes bypass circuit 126 to forward all frames received from the failed port 114 to the one or more backup ports 114 identified by the new destination port identifiers.

As mentioned above, switch 100 can populate forwarding tables 112 using a learning process. As part of this process, each time a switch 100 ingresses a frame on a port 114, the switch associates that port 114 with a source address of the frame, such as a media access control (MAC) address. However, when a port 114 is in loopback mode, such learning is not beneficial. Therefore, process 300 disables address learning (step 314) so that frames returned to the failed port 114 by the loopback circuit will not be learned.

Process 300 then places the port in loopback mode (step 316). At this point in the process 300 all frames sent to the failed port 114 to be egressed by the port 114 are instead transmitted to one or more backup ports 114. These backup ports 114 then egress the frames.

Finally process 300 informs the application layer of the network switch software of the port failure (step 318), preferably using a top-layer application programming interface executing on master CPU 108, and then ends (step 320). The application layer then modifies the forwarding tables 112 to direct traffic away from the failed port 114 as described above.

Figure 4:
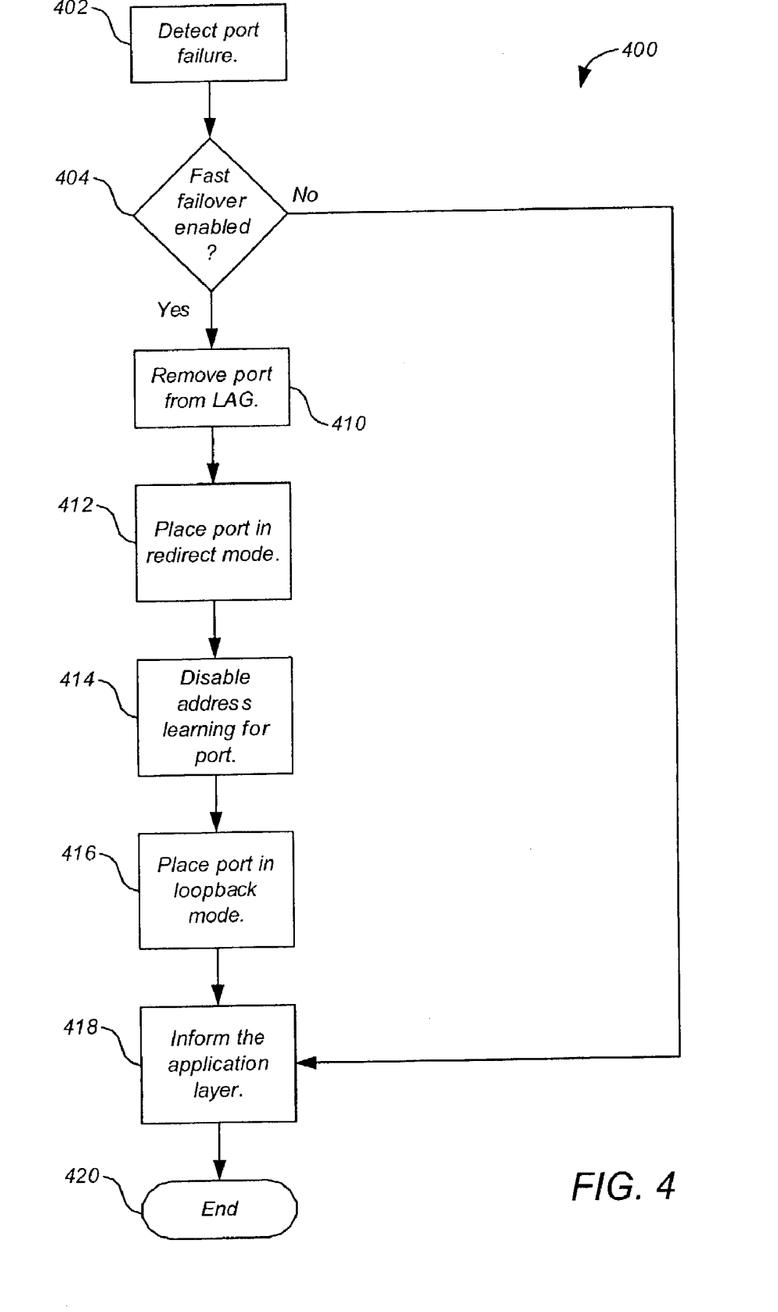
FIG. 4 shows a fast failover process for a port belonging to a link aggregation group according to a preferred embodiment.

FIG. 4 shows a fast failover process 400 for a port belonging to a link aggregation group according to a preferred embodiment. A link aggregation group is a group of two or more physical ports 114 that act as a single logical port, as is well-known in the relevant arts.

Portions of process 400 can be implemented by local CPU 116, master CPU 108, forwarding engine 110, and by controllers located within ports 114 or elsewhere in network switch 100. Although the steps of process 400 are described in a particular order, other embodiments can execute the steps in other orders, as will be apparent to one skilled in the relevant art after reading this description.

Process 400 begins when switch 100 detects the failure of a port 114 (that is, that the port 114 is not operational—step 402). Switch 100 can detect the failure of the port 114 by any of several methods well-known in the relevant arts. For example, port failure can be detected by the physical layer device 204 in the port 114, by the media access controller 202 in the port, by devices at other layers in the port, or by a controller such as the local CPU 116 or the master CPU 108. For example, the local CPU 116 can determine that a port 114 has failed when the port attempts to egress a frame of data a predetermined number of times, by testing a register bit in the port, or by like methods.

In a preferred embodiment, the fast failover process 400 can be enabled or disabled for each port 114. Therefore process 400 determines whether fast failover is enabled for the failed port 114 (step 404). If fast failover is disabled for the failed port 114, process 400 informs the application layer of the network switch software of the port failure (step 418), preferably using a top-layer application programming interface executing on master CPU 108, and then ends (step 420). The application layer then modifies the forwarding tables 112 as described above.

Process 400 removes the failed port 114 from the link aggregation group (step 410). Each line card 106 optionally includes a link aggregation group (LAG) table 120 stored in memory 118 that lists the ports 114 that belong to each link aggregation group. Process 400 determines whether a port 114 belongs to a link aggregation group by reading the link aggregation table 120, and removes a port 114 from a link aggregation group by writing to the link aggregation table 120.

But if fast failover is enabled for the failed port 114, process 400 then places the failed port 114 in "redirect mode (step 412). In redirect mode, a port 114 causes transfer circuit 122 to transfer all frames received from the port 114 to one or more predetermined backup ports 114 regardless of the content of the frames, such as layer-2 and layer-3 addresses, as described above. The backup ports are preferably the ports belonging to the link aggregation group to which the failed port 114 belongs. The identity of the link aggregation group is preferably stored in redirect register 206 in the port 114.

As mentioned above, switch 100 can populate forwarding tables 112 using a learning process. As part of this process, each time a switch 100 ingresses a frame on a port 114, the switch associates that port 114 with a source address of the frame, such as a media access control (MAC) address. However, when a port 114 is in loopback mode, such learning is not beneficial. Therefore, process 400 disables address learning (step 414) so that frames returned to the failed port 114 by the loopback circuit will not be learned.

Process 400 then places the port in loopback mode (step 416). At this point in the process 400 all frames sent to the failed port 114 to be egressed by the port 114 are instead transmitted to the backup port or ports 114 in the link aggregation group of the failed port, preferably according to a fairness scheme. These backup ports 114 then egress the frames.

Finally process 400 informs the application layer of the network switch software of the port failure (step 418), preferably using a top-layer application programming interface executing on master CPU 108, and then ends (step 420). The application layer then modifies the forwarding tables 112 to direct traffic away from the failed port 114 as described above.

The failover processes 300 and 400 execute quickly regardless of the size of the network switch 100 because the duration of the fast failover process is unrelated to the number of line cards 106, the number of forwarding tables 112, and the size of the forwarding tables 112. In general the interval between port failure and completion of the fast failover process is less than a millisecond.

Figure 5:
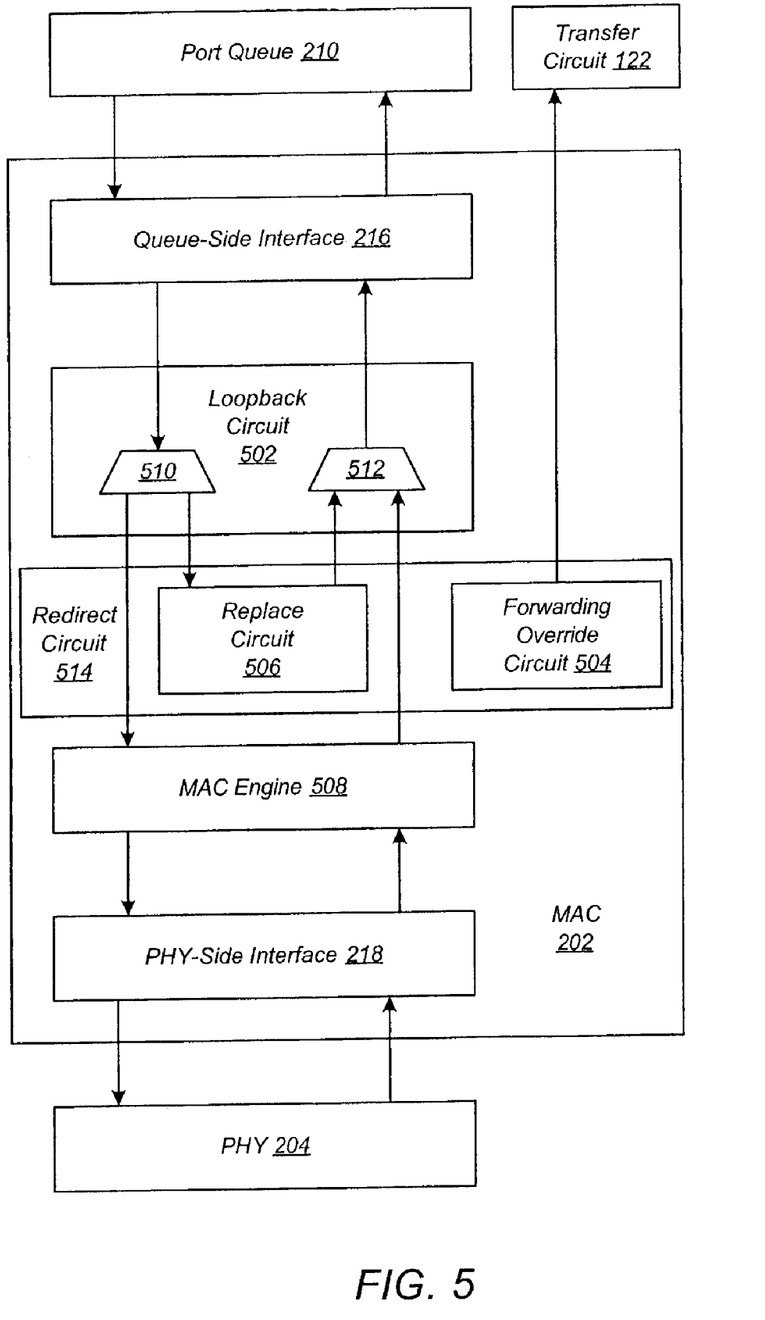
FIG. 5 shows detail of a media access controller according to one embodiment.

FIG. 5 shows detail of MAC 202 according to one embodiment. MAC 202 includes a MAC engine 508 that performs media access control functions well-known in the relevant arts, queue-side interface 216, and PHY-side interface 218. According to this embodiment, MAC 202 also includes a loopback circuit 502 and a redirect circuit 514. Redirect circuit 514 includes a replace circuit 506 and a forwarding override circuit 504. Loopback circuit 502 includes a demultiplexer 510 and a multiplexer 512. When port 114 is operational, multiplexer 510 directs all frames from queue-side interface 216 to MAC engine 508 and demultiplexer 512 directs all frames from MAC engine 508 to queue-side interface 216.

But when port 114 is not operational, demultiplexer 510 directs all frames from queue-side interface 216 to replace circuit 506. Replace circuit 506 replaces the destination port identifier associated with each frame as described above. Multiplexer 512 then directs the frames to queue-side interface 216. While port 114 is not operational, forwarding override circuit 504 causes transfer circuit 122 to transfer the frames to the port identified by the new destination port identifier associated with the frame, rather than according to the destination address of the frame.

Figure 6:
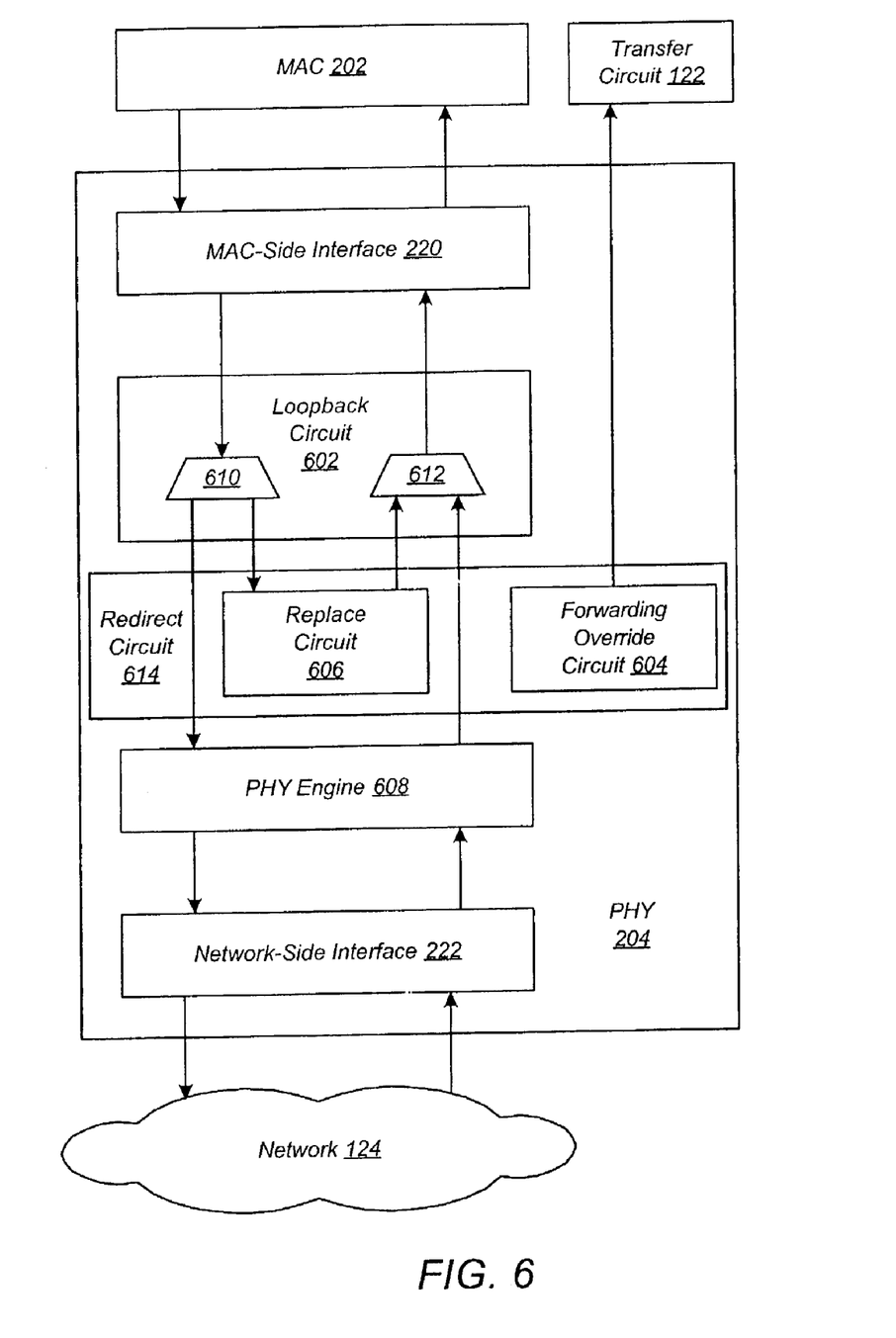
FIG. 6 shows detail of physical layer device according to one embodiment.

FIG. 6 shows detail of PHY 204 according to one embodiment. PHY 204 includes a PHY engine 608 that performs physical layer functions well-known in the relevant arts, MAC-side interface 220, and network-side interface 222. According to this embodiment, PHY 204 also includes a loopback circuit 602 and a redirect circuit 614. Redirect circuit 614 includes a replace circuit 606 and a forwarding override circuit 604. Loopback circuit 602 includes a demultiplexer 610 and a multiplexer 612. When port 114 is operational, multiplexer 610 directs all frames from MAC-side interface 220 to PHY engine 608 and demultiplexer 612 directs all frames from PHY engine 608 to MAC-side interface 220.

But when port 114 is not operational, demultiplexer 610 directs all frames from MAC-side interface 220 to replace circuit 606. Replace circuit 606 replaces the destination port identifier associated with each frame as described above. Multiplexer 612 then directs the frames to MAC-side interface 220. While port 114 is not operational, forwarding override circuit 604 causes transfer circuit 122 to transfer the frames to the port identified by the new destination port identifier associated with the frame, rather than according to the destination address of the frame.

Figure 7:
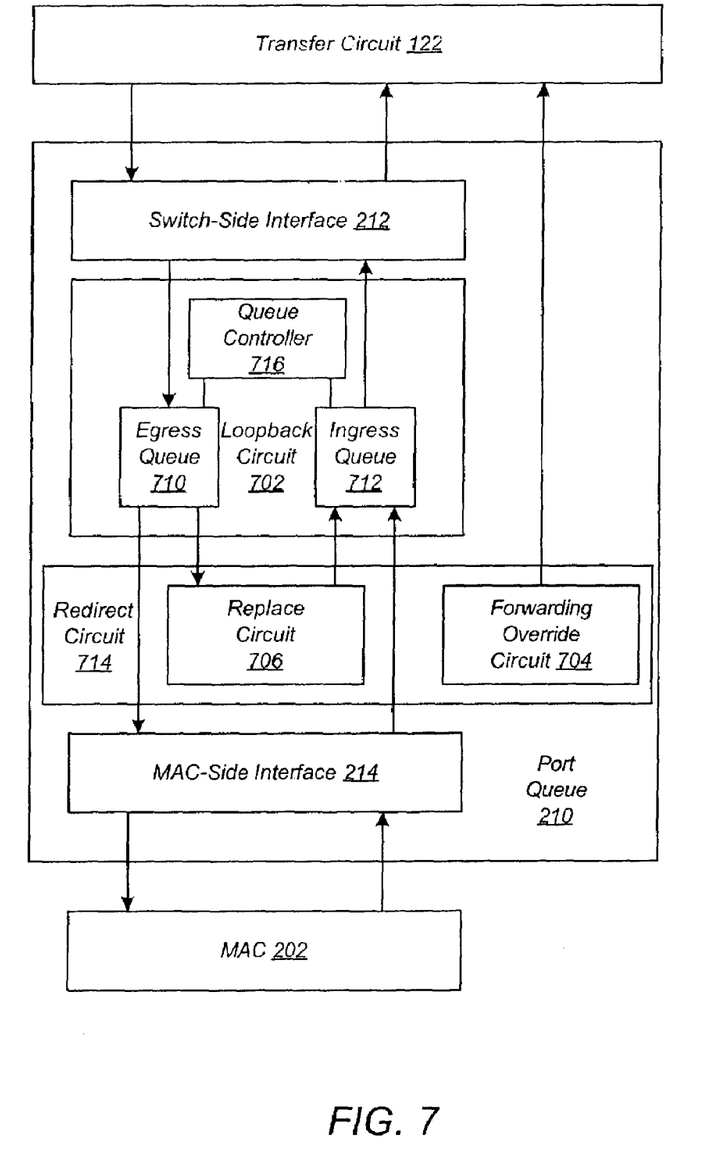
FIG. 7 shows detail of a port queue according to one embodiment.

FIG. 7 shows detail of port queue 210 according to one embodiment. Port queue 210 includes a switch-side interface 212 and MAC-side interface 214. According to this embodiment, port queue 210 also includes a loopback circuit 702 and a redirect circuit 714. Redirect circuit 714 includes a replace circuit 706 and a forwarding override circuit 704. Loopback circuit 702 includes a queue controller 716, an egress queue 710, and an ingress queue 712. When port 114 is operational, queue controller 716 directs all frames from egress queue 710 to MAC-side interface 214 and from MAC-side interface 214 to ingress queue 712.

But when port 114 is not operational, queue controller 716 directs all frames from egress queue 710 to replace circuit 706. Replace circuit 706 replaces the destination port identifier associated with each frame as described above. Queue controller 716 then directs the frames to ingress queue 712. While port 114 is not operational, forwarding override circuit 704 causes transfer circuit 122 to transfer the frames to the port identified by the new destination port identifier associated with the frame, rather than according to the destination address of the frame.

While FIGS. 5, 6 and 7 show the loopback and redirect circuits implemented within the same layer of the port 114 (that is, within only one of PHY 204, AMC 202 or port queue 210), it will be apparent to one skilled in the relevant arts that the loopback and redirect circuits can be implemented in separate layers of the port.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in a hardware state machine, or advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. List any additional modifications or variations. Accordingly, other implementations are within the scope of the following claims.

What is claimed is:

1. A network switch comprising:
  a plurality of ports each adapted to exchange frames of data with one or more network devices;
  a transfer circuit adapted to transfer the frames of the data between the ports; and
  wherein at least one of the ports comprises
    a loopback circuit adapted to send to the transfer circuit, when the one of the ports is not operational, each frame of the data received by the one of the ports from the transfer circuit, and
    a redirect circuit adapted to cause the transfer circuit to transfer, to one or more predetermined others of the ports, when the one of the ports is not operational, each frame of the data received by the transfer circuit from the one of the ports.

2. The network switch of claim 1, wherein a destination address and a destination port identifier are associated with each of the frames of the data, wherein the destination address is associated with one or more of the network devices, wherein the destination port identifier identifies one or more of the ports, and wherein the transfer circuit comprises:
  a forwarding engine adapted to forward each frame of the data from the one of the ports to one or more others of the ports according to the destination address associated with the frame of the data when the one of the ports is operational;
  wherein the redirect circuit comprises
    a replace circuit adapted, when the one of the ports is not operational, to replace, with destination identifiers of the one or more predetermined others of the ports, the destination port identifier associated with each frame of the data received by the one of the ports from the transfer circuit, and
    a forwarding override circuit adapted, when the one of the ports is not operational, to cause the forwarding engine to forward each frame of the data received by the transfer circuit from the one of the ports according to the destination port identifier associated with the frame, and not according to the destination address associated with the frame.

3. The network switch of claim 2, further comprising:
  a memory adapted to store one or more forwarding tables containing associations between the ports and the destination addresses;
  wherein the forwarding engine is further adapted, when the one of the ports is operational, to forward each frame of the data according to the associations contained in the forwarding tables and the destination address associated with the frame of the data; and
  a controller adapted to modify the forwarding tables to replace the associations between the one of the ports and the destination addresses with associations between the one or more predetermined others of the ports and the destination addresses.

4. The network switch of claim 1, wherein a destination address and a destination port identifier are associated with each of the frames of the data, wherein the destination address is associated with one or more of the network devices, wherein the destination port identifier identifies one or more of the ports, wherein the transfer circuit comprises a forwarding engine adapted to forward each frame of the data from the one of the ports to one or more others of the ports according to the destination address associated with the frame of the data;

wherein the redirect circuit comprises a replace circuit adapted, when the one of the ports is not operational, to replace the destination port identifier associated with each frame of the data received by the one of the ports from the transfer circuit with destination identifiers of the one or more predetermined others of the ports; and wherein the transfer circuit further comprises a bypass circuit adapted to forward, when the one of the ports is not operational, each frame of the data received by the transfer circuit from the one of the ports according to the destination port identifier associated with the frame, and not according to the destination address associated with the frame.

5. The network switch of claim 4, further comprising:

a memory adapted to store one or more forwarding tables containing associations between the ports and the destination addresses;

wherein the forwarding engine is further adapted, when the one of the ports is operational, to forward each frame of the data according to the associations contained in the forwarding tables and the destination address associated with the frame of the data; and a controller adapted to modify the forwarding tables to replace the associations between the one of the ports and the destination addresses with associations between the one or more predetermined others of the ports and the destination addresses.

6. The network switch of claim 1, wherein the redirect circuit is implemented within at least one of the group comprising:

one or more port queues of the one of the ports;
a media access controller of the one of the ports; and
a physical layer device of the one of the ports.

7. The network switch of claim 1, wherein the loopback circuit is implemented within at least one of the group comprising:

one or more port queues of the one of the ports;
a media access controller of the one of the ports; and
a physical layer device of the one of the ports.

8. The network switch of claim 1, wherein the one of the ports and the one or more predetermined others of the ports are members of a link aggregation group, and wherein the network switch further comprises:

a controller adapted to remove the one of the ports from the link aggregation group when the one of the ports is not operational.

9. The network switch of claim 3, wherein the controller, when a learning mode is enabled for the one of the ports, modifies the associations contained in the forwarding tables to associate the one of the ports with source addresses of frames of the data received by the forwarding engine from the one of the ports; and wherein the learning mode is disabled for the one of the ports when the one of the ports is not operational.

10. A network switch comprising:

a plurality of port means each for exchanging frames of data with one or more network devices;
transfer means for transferring the frames of the data between the port means; and wherein at least one of the port means comprises loopback means for sending to the transfer means, when the one of the port means is not operational, each frame of the data received by the one of the port means from the transfer means, and redirect means for causing the transfer means to transfer, to one or more predetermined others of the port means, when the one of the port means is not operational, each frame of the data received by the transfer means from the one of the port means.

11. The network switch of claim 10, wherein a destination address and a destination port identifier are associated with each of the frames of the data, wherein the destination address is associated with one or more of the network devices, wherein the destination port identifier identifies one or more of the port means, and wherein the transfer means comprises:

forwarding engine means for forwarding each frame of the data from the one of the port means to one or more others of the port means according to the destination address associated with the frame of the data when the one of the port means is operational;

wherein the redirect means comprises replace means for, when the one of the port means is not operational, replacing, with destination identifiers of the one or more predetermined others of the port means, the destination port identifier associated with each frame of the data received by the one of the port means from the transfer means, and forwarding override means for, when the port is not operational, causing the forwarding engine means to forward each frame of the data received by the transfer means from the one of the port means according to the destination port identifier associated with the frame, and not according to the destination address associated with the frame.

12. The network switch of claim 11, further comprising:

memory means for storing one or more forwarding tables containing associations between the port means and the destination addresses;

wherein the forwarding engine means, when the port is operational, forwards each frame of the data according to the associations contained in the forwarding tables and the destination address associated with the frame of the data; and controller means for modifying the forwarding tables to replace the associations between the one of the port means and the destination addresses with associations between the one or more predetermined others of the port means and the destination addresses.

13. The network switch of claim 10, wherein a destination address and a destination port identifier are associated with each of the frames of the data, wherein the destination address is associated with one or more of the network devices, wherein the destination port identifier identifies one or more of the port means, wherein the transfer means comprises forwarding engine means for forwarding each frame of the data from the one of the port means to one or more others of the port means according to the destination address associated with the frame of the data;

wherein the redirect means comprises replace means for, when the one of the port means is not operational, replacing the destination port identifier associated with each frame of the data received by the one of the port means from the transfer means with destination identifiers of the one or more predetermined others of the port means; and wherein the transfer means further comprises bypass means for forwarding, when the one of the port means is not operational, each frame of the data received by the transfer means from the one of the port means according to the destination port identifier associated with the frame, and not according to the destination address associated with the frame.

14. The network switch of claim 13, further comprising:
memory means for storing one or more forwarding tables containing associations between the port means and the destination addresses;

wherein the forwarding engine means, when the one of the port means is operational, forwards each frame of the data according to the associations contained in the forwarding tables and the destination address associated with the frame of the data; and controller means for modifying the forwarding tables to replace the associations between the one of the port means and the destination addresses with associations between the one or more predetermined others of the port means and the destination addresses.

15. The network switch of claim 10, wherein the one of the port means and the one or more predetermined others of the port means are members of a link aggregation group, and wherein the network switch further comprises:
controller means for removing the one of the port means from the link aggregation group when the one of the port means is not operational.

16. The network switch of claim 12,
wherein the controller means, when a learning mode is enabled for the one of the port means, modifies the associations contained in the forwarding tables to associate the one of the port means with source addresses of frames of the data received by the forwarding engine means from the one of the port means; and wherein the learning mode is disabled for the one of the port means when the one of the port means is not operational.

17. A port failover circuit for redirecting frames of data, sent to a port in a network switch by a transfer circuit in the network switch, to one or more other ports in the network switch, comprising:
a loopback circuit adapted to send to the transfer circuit, when the port is not operational, each frame of the data received by the port from the transfer circuit, and
a redirect circuit adapted to cause the transfer circuit to transfer, to one or more predetermined others of the ports, when the port is not operational, each frame of the data received by the transfer circuit from the port.

18. The port failover circuit of claim 17, wherein a destination address and a destination port identifier are associated with each of the frames of the data, wherein the destination address is associated with one or more network devices, wherein the destination port identifier identifies one or more of the ports, and wherein the redirect circuit comprises:
a replace circuit adapted, when the port is not operational, to replace, with destination identifiers of the one or more predetermined others of the ports, the destination port identifier associated with each frame of the data received by the port from the transfer circuit, and
a forwarding override circuit adapted, when the port is not operational, to cause the transfer circuit to forward each frame of the data received by the transfer circuit from the port according to the destination port identifier associated with the frame, and not according to the destination address associated with the frame.

19. The port failover circuit of claim 17, wherein the redirect circuit is implemented within at least one of the group comprising:
one or more port queues of the port;
a media access controller of the port; and
a physical layer device of the port.

20. The port failover circuit of claim 17, wherein the loopback circuit is implemented within at least one of the group comprising:
one or more port queues of the port; a media access controller of the port; and
a physical layer device of the port.

21. A port failover circuit for redirecting frames of data, sent to a port in a network switch by a transfer circuit in the network switch, to one or more other ports in the network switch, comprising:
loopback means for sending to the transfer circuit, when the port is not operational, each frame of the data received by the port from the transfer circuit, and
redirect means for causing the transfer circuit to transfer, to one or more predetermined others of the ports, when the port is not operational, each frame of the data received by the transfer circuit from the port.

22. The port failover circuit of claim 21, wherein a destination address and a destination port identifier are associated with each of the frames of the data, wherein the destination address is associated with one or more network devices, wherein the destination port identifier identifies one or more of the ports, and wherein the redirect means comprises:
replace means for, when the port is not operational, replacing, with destination identifiers of the one or more predetermined others of the ports, the destination port identifier associated with each frame of the data received by the port from the transfer circuit, and
forwarding override means for, when the port is not operational, causing the transfer circuit to forward each frame of the data received by the transfer circuit from the port according to the destination port identifier associated with the frame, and not according to the destination address associated with the frame.

23. A network comprising:
a first network device;
a second network device;
a network switch comprising
a first port adapted to receive frames of the data from the first network device,
a second port adapted to send the frames of the data to the second network device,
one or more third ports adapted to send the frames of the data to the second network device, and
a transfer circuit adapted to transfer the frames of the data from the first port to the second port,
wherein the second port comprises
a loopback circuit adapted to send to the transfer circuit, when the second port is not operational, each frame of the data received by the second port from the transfer circuit, and
a redirect circuit adapted to cause the transfer circuit to transfer, to the one or more third ports, when the second port is not operational, each frame of the data received by the transfer circuit from the second port.

24. The network of claim 23, wherein a destination address and a destination port identifier are associated with each of the frames of the data, wherein the destination address is associated with one or more of the network devices, wherein the destination port identifier identifies one or more of the ports, and wherein the transfer circuit comprises:

a forwarding engine adapted to forward each frame of the data to one or more of the ports according to the destination address associated with the frame of the data when the second port is operational;

wherein the redirect circuit comprises a replace circuit adapted, when the second port is not operational, to replace, with the destination identifier of the one or more third ports, the destination port identifier associated with each frame of the data received by the second port from the transfer circuit, and a forwarding override circuit adapted, when the second port is not operational, to cause the forwarding engine to forward each frame of the data received by the transfer circuit from the second port according to the destination port identifier associated with the frame, and not according to the destination address associated with the frame.

25. The network of claim 24, wherein the network switch further comprises:

a memory adapted to store one or more forwarding tables containing associations between the ports and the destination addresses;

wherein the forwarding engine is further adapted, when the second port is operational, to forward each frame of the data according to the associations contained in the forwarding tables and the destination address associated with the frame of the data; and a controller adapted to modify the forwarding tables to replace the associations between the second port and the destination addresses with associations between the one or more third ports and the destination addresses.

26. The network of claim 23, wherein a destination address and a destination port identifier are associated with each of the frames of the data, wherein the destination address is associated with one or more of the network devices, wherein the destination port identifier identifies one or more of the ports, wherein the transfer circuit comprises a forwarding engine adapted to forward each frame of the data to one or more of the ports according to the destination address associated with the frame of the data;

wherein the redirect circuit comprises a replace circuit adapted, when the second port is not operational, to replace the destination port identifier associated with each frame of the data received by the second port from the transfer circuit with destination identifiers of the one or more third ports; and wherein the transfer circuit further comprises a bypass circuit adapted to forward, when the second port is not operational, each frame of the data received by the transfer circuit from the second port according to the destination port identifier associated with the frame, and not according to the destination address associated with the frame.

27. The network of claim 26, further comprising:

a memory adapted to store one or more forwarding tables containing associations between the ports and the destination addresses;

wherein the forwarding engine is further adapted, when the second port is operational, to forward each frame of the data according to the associations contained in the forwarding tables and the destination address associated with the frame of the data; and a controller adapted to modify the forwarding tables to replace the associations between the second port and the destination addresses with associations between the one or more third ports and the destination addresses.

28. The network of claim 23, wherein the redirect circuit is implemented within at least one of the group comprising:

one or more port queues of the second port;

a media access controller of the second port; and a physical layer device of the second port.

29. The network of claim 23, wherein the loopback circuit is implemented within at least one of the group comprising:

one or more port queues of the second port;

a media access controller of the second port; and a physical layer device of the second port.

30. The network of claim 23, wherein the second port and the one or more third ports are members of a link aggregation group, and wherein the network switch further comprises:

a controller adapted to remove the second port from the link aggregation group when the second port is not operational.

31. The network of claim 25, wherein the controller, when a learning mode is enabled for the second port, modifies the associations contained in the forwarding tables to associate the second port with source addresses of frames of the data received by the forwarding engine from the second port; and wherein the learning mode is disabled for the second port when the second port is not operational.

32. A network comprising:

first network device means for sending frames of data;

second network device means for receiving the frames of the data;

network switch means for transferring the frames of the data from the first network device means to the second network device means, the network switch means comprising first port means for receiving the frames of the data from the first network device, second port means for sending the frames of the data to the second network device, one or more third port means for sending the frames of the data to the second network device, and transfer means for transferring the frames of the data from the first port means to the second port means, wherein the second port means comprises loopback means for sending to the transfer means, when the second port means is not operational, each frame of the data received by the second port means from the transfer means, and redirect means for causing the transfer means to transfer, to the one or more third port means, when the second port means is not operational, each frame of the data received by the transfer means from the second port means.

33. The network of claim 32, wherein a destination address and a destination port identifier are associated with each of the frames of the data, wherein the destination address is associated with one or more of the network device means, wherein the destination port identifier identifies one or more of the port means, and wherein the transfer means comprises:

forwarding engine means for forwarding each frame of the data to one or more of the port means according to the destination address associated with the frame of the data when the second port means is operational;
wherein the redirect means comprises
replace means for, when the second port means is not operational, replacing, with the destination identifier of the one or more third port means, the destination port identifier associated with each frame of the data received by the second port means from the transfer means, and
forwarding override means for, when the second port means is not operational, causing the forwarding engine means to forward each frame of the data received by the transfer means from the second port means according to the destination port identifier associated with the frame, and not according to the destination address associated with the frame.

34. The network of claim 33, wherein the network switch means further comprises:
memory means for storing one or more forwarding tables containing associations between the port means and the destination addresses;
wherein the forwarding engine means, when the second port means is operational, forwards each frame of the data according to the associations contained in the forwarding tables and the destination address associated with the frame of the data; and
controller means for modifying the forwarding tables to replace the associations between the second port means and the destination addresses with associations between the one or more third port means and the destination addresses.

35. The network of claim 32, wherein a destination address and a destination port identifier are associated with each of the frames of the data, wherein the destination address is associated with one or more of the network device means, wherein the destination port identifier identifies one or more of the port means,
wherein the transfer means comprises forwarding engine means for forwarding each frame of the data to one or more of the port means according to the destination address associated with the frame of the data;
wherein the redirect means comprises replace means for, when the second port means is not operational, replacing the destination port identifier associated with each frame of the data received by the second port means from the transfer means with destination identifiers of the one or more third port means; and
wherein the transfer means further comprises bypass means for forwarding, when the second port means is not operational, each frame of the data received by the transfer means from the second port means according to the destination port identifier associated with the frame, and not according to the destination address associated with the frame.

36. The network of claim 35, further comprising:
memory means for storing one or more forwarding tables containing associations between the port means and the destination addresses;
wherein the forwarding engine means, when the second port means is operational, forwards each frame of the data according to the associations contained in the forwarding tables and the destination address associated with the frame of the data; and
controller means for modifying the forwarding tables to replace the associations between the second port means and the destination addresses with associations between the one or more third port means and the destination addresses.

37. The network of claim 32, wherein the second port means and the one or more third port means are members of a link aggregation group, and wherein the network switch means further comprises:
controller means for removing the second port from the link aggregation group when the second port means is not operational.

38. The network of claim 34,
wherein the controller means, when a learning mode is enabled for the second port means, modifies the associations contained in the forwarding tables to associate the second port means with source addresses of frames of the data received by the forwarding engine means from the second port means; and
wherein the learning mode is disabled for the second port means when the second port means is not operational.

39. A method for handling port failover in a network switch comprising a plurality of ports, wherein each of the ports is adapted to exchange frames of data with one or more network devices, and a transfer circuit for transferring the frames of the data between the ports, the method comprising:
detecting that one of the ports is not operational;
sending to the transfer circuit, when the one of the ports is not operational, each frame of the data received by the one of the ports from the transfer circuit, and
causing the transfer circuit to transfer, to one or more predetermined others of the ports, when the one of the ports is not operational, each frame of the data received by the transfer circuit by the one of the ports.

40. The method of claim 39, wherein a destination address and a destination port identifier are associated with each of the frames of the data, wherein the destination address is associated with one or more of the network devices, wherein the destination port identifier identifies one or more of the ports, wherein the transfer circuit forwards each frame of the data from the one of the ports to one or more others of the ports according to the destination address associated with the frame of the data when the one of the ports is operational, and wherein causing the transfer circuit to transfer comprises:
replacing, with destination identifiers of the one or more predetermined others of the ports, the destination port identifier associated with each frame of the data received by the one of the ports from the transfer circuit, and
causing the transfer circuit to forward each frame of the data received by the transfer circuit from the one of the ports according to the destination port identifier associated with the frame, and not according to the destination address associated with the frame.

41. The method of claim 40, wherein the network switch transfers the frames of the data between the ports according to one or more forwarding tables containing associations between the ports and the destination addresses, and wherein the method further comprises:
modifying the forwarding tables to replace the associations between the one of the ports and the destination addresses with associations between the one or more predetermined others of the ports and the destination addresses.

42. The method of claim 39, wherein the one of the ports and the one or more predetermined others of the ports are members of a link aggregation group, and wherein the method further comprises:

removing the one of the ports from the link aggregation group when the one of the ports is not operational.

43. The method of claim 41, wherein the network switch, when a learning mode is enabled for the one of the ports, modifies the associations contained in the forwarding tables to associate the one of the ports with source addresses of frames of the data received by the transfer circuit from the one of the ports, and wherein the method further comprises:

disabling the learning mode for the one of the ports when the one of the ports is not operational.

44. Computer-readable media embodying instructions executable by a computer to perform a method for handling port failover in a network switch comprising a plurality of ports, wherein each of the ports is adapted to exchange frames of data with one or more network devices, and a transfer circuit for transferring the frames of the data between the ports, the method comprising:

detecting that one of the ports is not operational;

sending to the transfer circuit, when the one of the ports is not operational, each frame of the data received by the one of the ports from the transfer circuit, and causing the transfer circuit to transfer, to one or more predetermined others of the ports, when the one of the ports is not operational, each frame of the data received by the transfer circuit by the one of the ports.

45. The computer-readable media of claim 44, wherein a destination address and a destination port identifier are associated with each of the frames of the data, wherein the destination address is associated with one or more of the network devices, wherein the destination port identifier identifies one or more of the ports, wherein the transfer circuit forwards each frame of the data from the one of the ports to one or more others of the ports according to the destination address associated with the frame of the data when the one of the ports is operational, and wherein causing the transfer circuit to transfer comprises:

replacing, with destination identifiers of the one or more predetermined others of the ports, the destination port identifier associated with each frame of the data received by the one of the ports from the transfer circuit, and causing the transfer circuit to forward each frame of the data received by the transfer circuit from the one of the ports according to the destination port identifier associated with the frame, and not according to the destination address associated with the frame.

46. The computer-readable media of claim 45, wherein the network switch transfers the frames of the data between the ports according to one or more forwarding tables containing associations between the ports and the destination addresses, and wherein the method further comprises:

modifying the forwarding tables to replace the associations between the one of the ports and the destination addresses with associations between the one or more predetermined others of the ports and the destination addresses.

47. The computer-readable media of claim 44, wherein the one of the ports and the one or more predetermined others of the ports are members of a link aggregation group, and wherein the method further comprises:

removing the one of the ports from the link aggregation group when the one of the ports is not operational.

48. The computer-readable media of claim 46, wherein the network switch, when a learning mode is enabled for the one of the ports, modifies the associations contained in the forwarding tables to associate the one of the ports with source addresses of frames of the data received by the transfer circuit from the one of the ports, and wherein the method further comprises:

disabling the learning mode for the one of the ports when the one of the ports is not operational.

* * * * *

UNITED STATES PATENT AND TRADEMARK OFFICE
CERTIFICATE OF CORRECTION

PATENT NO. : 7,120,834 B1
APPLICATION NO. : 10/353451
DATED : October 10, 2006
INVENTOR(S) : Nafea Bishara It is certified that error appears in the above-identified patent and that said Letters Patent is hereby corrected as shown below:

Column 9, Line 52      Insert --"--after "mode"

Signed and Sealed this

Ninth Day of January, 2007

JON W. DUDAS
*Director of the United States Patent and Trademark Office*